(No Model.)

C. H. MITTLER.
ANIMAL TRAP.

No. 383,972. Patented June 5, 1888.

WITNESSES:
F. McArdle
C. Sedgwick

INVENTOR:
C. H. Mittler
BY Munn & Co.
ATTORNEYS.

UNITED STATES PATENT OFFICE.

CHARLES H. MITTLER, OF MARTHASVILLE, MISSOURI.

ANIMAL-TRAP.

SPECIFICATION forming part of Letters Patent No. 383,972, dated June 5, 1888.

Application filed March 3, 1888. Serial No. 266,025. (No model.)

*To all whom it may concern:*

Be it known that I, CHARLES H. MITTLER, of Marthasville, in the county of Warren and State of Missouri, have invented a new and Improved Rat or Mouse Trap, of which the following is a full, clear, and exact description.

This invention relates to a novel form of animal-trap, the trap being designed more especially for use as a mouse or rat trap, the main objects of the invention being to dispense with all attachments likely to arouse the suspicions of the animal, and at the same time to produce an efficient trap; and to these ends the invention consists, essentially, of a tilting platform provided with a hook and a bait-pin, sliding doors, levers connected to the doors, and a retaining device arranged for engagement with the platform-hook and with the levers, all as will be hereinafter more fully described, and specifically pointed out in the claims.

Reference is to be had to the accompanying drawings, forming a part of this specification, in which similar figures of reference indicate corresponding parts in both the views.

Figure 1:
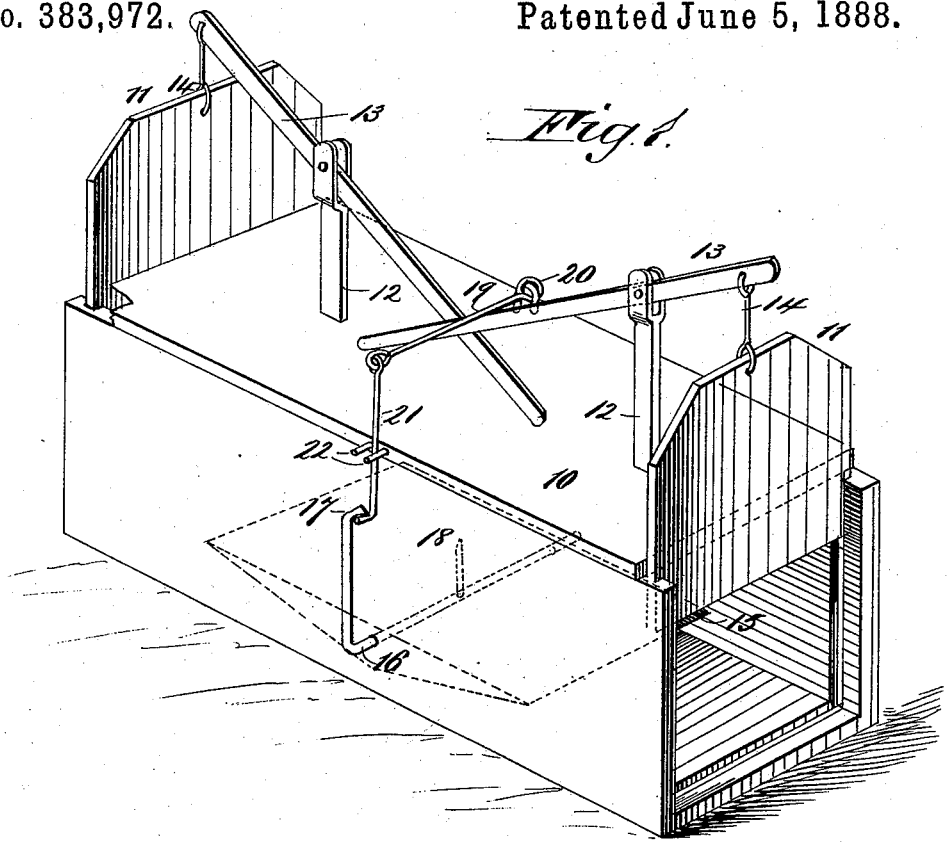
Figure 2:
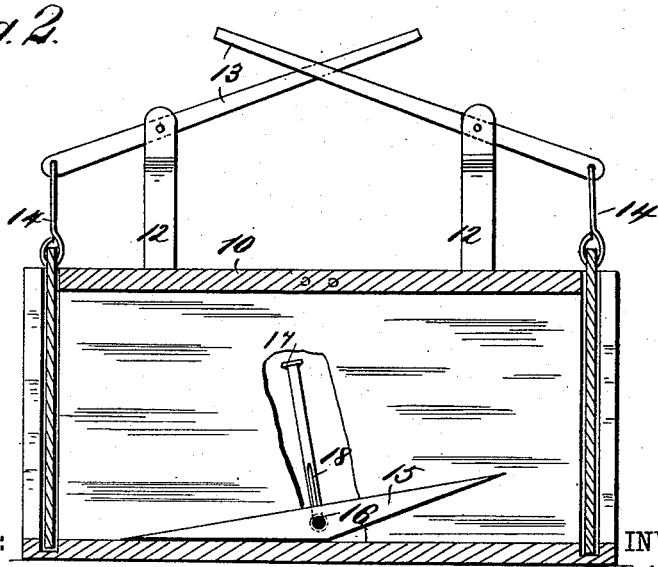

Figure 1 is a perspective view of my improved form of trap, the parts being represented as they appear when the trap is set, and Fig. 2 is a central longitudinal sectional view of the same, the parts, however, being represented as they appear when the trap is sprung.

In the drawings, 10 represents an oblong box-like structure, at each end of which there is mounted a sliding door, 11, said door sliding in the vertical grooves made in the sides of the box. Upon the top of the box I secure standards 12, which serve as the supports for levers 13, the inner-arms of which overlap, while the outer arms are connected to the doors 11 by links 14.

Within the box 10 I mount a platform, 15, the under side of which is preferably in the form of a double-inclined plane, as clearly shown in the drawings. This platform is rigidly connected to a cross-shaft, 16, the outer end of which shaft is bent up to the form of a hook, as shown at 17. (See Fig. 1.) At the center of the shaft there is arranged a bait-pin, 18, which extends upward from the face of the tilting plate 15. A short cross-bar, 19, is connected to the top of the box 10 by a staple or eyebolt, 20, and to the opposite end of this cross-bar there is connected a hook, 21, which extends downward between two guiding-pins, 22, to a point, so that it may be engaged by the hook 17 of the cross-shaft 16.

In operation bait is placed upon the pin 18, the inner ends of the levers 13 are depressed, the cross-bar 19 is placed over the levers, and its hook 21 is brought into engagement with the hook 17 of the shaft 16, as represented in Fig. 1. If at this time the box 10 be entered by an animal, the plate 15 will be tilted and the hook 17 thrown from engagement with the hook 21, thus releasing the hold upon the cross-bar 19, and permitting the doors 11 to slip downward and close the openings at the ends of the box.

In the drawings I have represented the box as being made of wood; but I desire it to be distinctly understood that any proper material could be employed in the construction of the box.

Having thus described my invention, I claim as new and desire to secure by Letters Patent—

1. In an animal-trap, the combination, with the rectangular box 10, having vertical grooves at its open ends, and doors 11, sliding in said grooves, of the pivotally supported levers 13, and the links 14, connecting said levers loosely with the sliding doors, the cross-bar 19, the hook 21, the tilting platform 15, and an upwardly-extending hook, 17, rigidly connected to said platform and adapted to engage the hook 21, substantially as shown and described.

2. In an animal-trap, the combination, with the rectangular box 10, having vertical grooves at its open ends, and the doors 11, sliding in said grooves, of the levers 13, the standards 12, supporting said levers, the link 14, which loosely connects the lever with the sliding door, the cross-bar 19, the hook 21, the tilting platform carrying the bait-pin 18, and the upwardly-extending hook 17, rigidly connected to said platform and adapted to engage with the hook 21, substantially as shown and described.

CHARLES H. MITTLER.

Witnesses:
GEO. H. MITTLER,
VAL BURGESS.